Sept. 30, 1952     P. W. JOHNSON     2,611,965
GAUGE WITH PIVOTAL AND LATERALLY MOVABLE GAUGE MEMBER
Filed Sept. 10, 1948
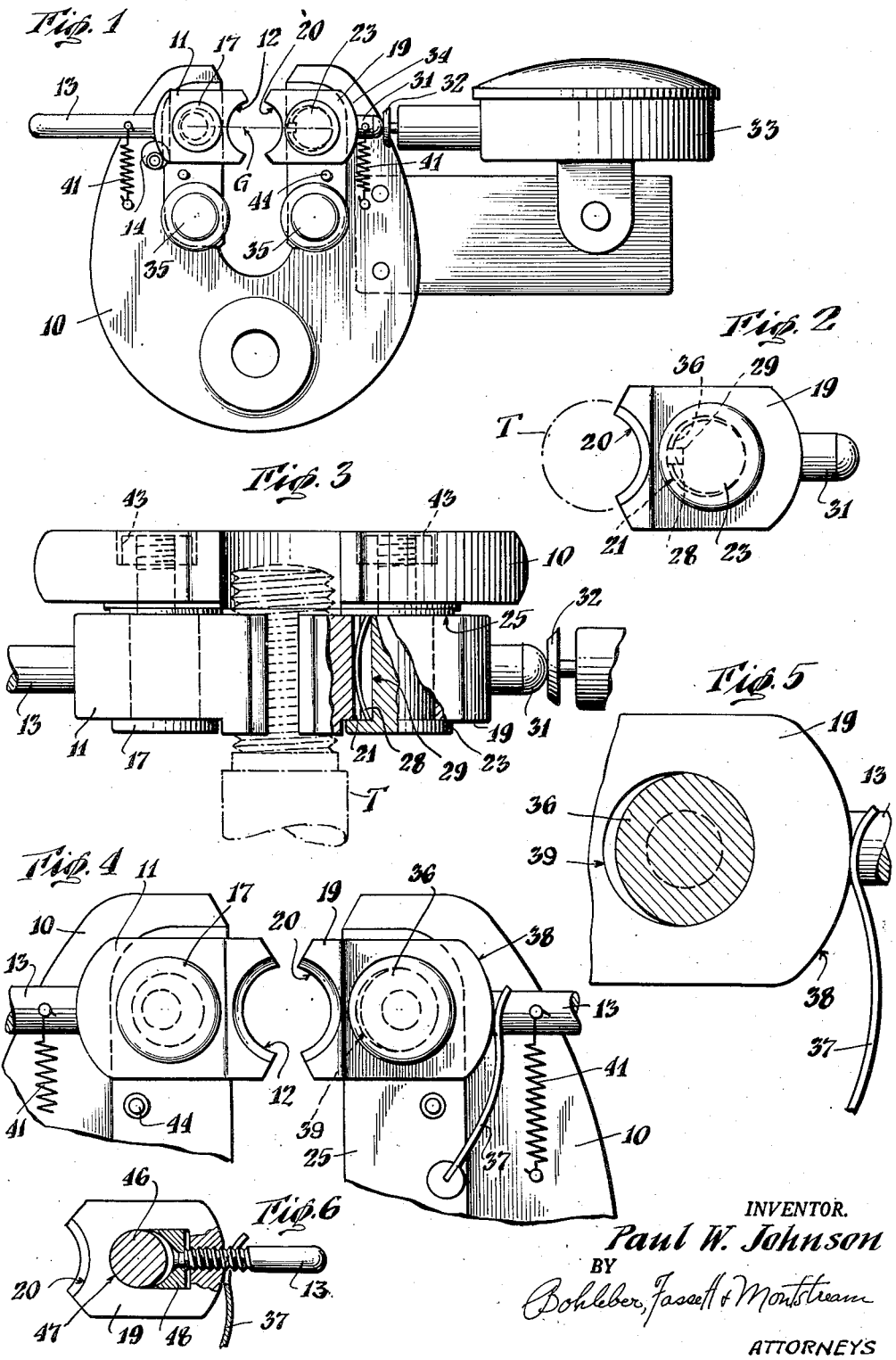
INVENTOR.
Paul W. Johnson
BY
Bohleber, Jassett & Montstream
ATTORNEYS Patented Sept. 30, 1952

2,611,965

UNITED STATES PATENT OFFICE 2,611,965

GAUGE WITH PIVOTAL AND LATERALLY MOVABLE GAUGE MEMBER

Paul W. Johnson, Bloomfield, Conn., assignor to The Johnson Gage Company, Bloomfield, Conn., a corporation of Connecticut Application September 10, 1948, Serial No. 48,692

12 Claims. (Cl. 33—148)

1

The invention relates to a gage for testing whether or not a cylindrical test part is within allowable tolerances. The gage may be used on cylindrical surfaces which may be smooth or plain, circumferentially grooved or ridged, or spirally ridged such as screw thread. The gage to be described herein simplifies the construction of the gage shown in my Patent 2,432,160 as well as the gage shown in my pending application Serial Number 698,955 so that a comparator gage is provided which can be manufactured at a cost considerably less than that shown in the above identified patent and application and with the same or approximately the same degree of accuracy.

An object of the invention is to construct a new and novel comparator gage which is simpler and less expensive to manufacture and which gage has at least one pivotal gaging member moving in a path spaced from the other gage member.

Another object of the invention is to construct a comparator gage having a pair of cooperating gage members at least one of which is pivoted and has a concave gaging means for engaging a test part at a plurality of points around the periphery thereof and in which one gage member is mounted upon its pivotal mounting means so that it has a compound movement both pivotal and lateral which movement is indicated in order to determine the variation of the test part from a predetermined or desired standard.

Another object of the invention is to construct a new and novel snap gage for cylindrical test parts which may be plain or smooth surfaced, grooved or ridged, or have spiral ridges such as a screw thread which comprises a single pair of cooperating pivotal and laterally movable gage members which serve both as a go and not-go gage.

Other objects of the invention will be apparent from the following description when taken in connection with the accompanying drawings illustrating preferred embodiments of the gage in which:

Figure 1 is a side elevation of the gage.

Figure 2 is an enlarged view of the laterally movable gage member.

Figure 3 is an enlarged top view of the gage of Figure 1 with a section through a portion of one of the pivotal mounting means and a gage member.

Figure 4 is an enlarged elevation of a snap type gage.

2

Figure 5 is an enlarged view in section through the pivotal mounting means or stud for a gage member of Figure 4.

Figure 6 shows a gage member having a different form of means to adjust the extent of lateral movement.

The gage includes a frame 10 having a pair of cooperating gage members mounted thereupon. A first gage member 11 may be of any suitable construction such as the roll shown in the above referred to application but preferably it is a pivoted gage member having a concave gaging means or surface 12. The concave gaging surface may be plain or smooth for gaging smooth surfaced cylindrical parts which may be straight or tapered or the surface may carry a ridge or groove for cylindrical parts having a groove or ridge respectively or the gaging means may carry spiral ridges for gaging a screw thread or the like. The gage member may have a handle 13 for manipulating the same.

When the gage is the comparator type as shown in Figures 1 to 3 and utilizes a first gage member of the pivotal type as illustrated in these figures, stop means 14 of any suitable construction is provided so as to prevent the test part from passing beyond gaging position. The stop means may be engaged by the test part or by one of the pivotal gage members and is shown as engaged by the first gage member to prevent it from pivoting beyond gaging position as will be discussed more fully hereinafter. The stop means may be applied to the gage member 19 if desired so long as it does not restrict lateral movement thereof. The stop means shown is an eccentric so that the position at which the gage member stops in its pivotal movement, may be adjusted as desired.

The first gage member is mounted upon the frame 10 and when it is a pivotal gage member a pivotal mounting means or stud 17 is used therefor. The stud preferably is eccentric to permit adjustment of the position of the stud and hence of the gage member mounted thereupon relatively to its cooperating gage member.

A second gage member 19 is mounted upon the frame 10 and carries a concave gaging means or surface 20 to engage a plurality of points around the periphery of the test part. The particular form of gaging means illustrated is a concave surface although the gaging means may comprise two or more gaging rolls mounted in spaced relation upon a gaging member as illustrated in my above referred to application. The concave gaging means 20 may be and usually is similar to or like that of the concave gaging means 12. The gage member carries a hole 21 for receiving a mounting means by means of which the member is mounted upon the frame. The paths of movement of the gage members or particularly the gaging means are spaced from yet adjacent each other at gaging position.

The second gage member 19 is mounted upon the frame 10 for a combined pivotal and lateral movement and the construction of mounting may take many forms. The mounting means particularly shown is a pivot means including a stud or pin means 23 which is smaller than the bearing means or hole 21 in the gage member such as by ten to twenty thousandths of an inch. In other words the difference in diameter between the bearing hole 21 and the stud 23 is greater than the tolerance range of the gage. The gage member 19, therefore, has both pivotal movement on the stud and lateral or radial movement provided by the differences in diameter between the stud and the bearing hole. In order to prevent axial misalignment of the second gage member, the play of the gage member upon the stud is restricted as well as twisting thereof by providing lateral support for the gage member such as at least one fixed surface against which the gage member is held in its pivotal and lateral movement or between two parallel and fixed surfaces. One such fixed surface 24 is carried by the head of the stud 23 and the other may be the face 25 of the frame 10, or it may be a washer, sufficient clearance being provided to allow free pivotal and lateral or radial movement of the gage member. It is clear that the same result can be achieved by providing an equivalent design with one fixed surface and retaining the gage member against the surface such as by means of a spring.

Means are provided to propel the second gage member radially or laterally in the direction of the first gage member. This means may take various forms, that illustrated being a bowed spring 28 resting in a groove 29 in one part such as the stud 23 and engaging the other part such as the surface of the hole 21 of the second gage member. The groove is located so that the spring pressure is exerted to propel the second gage member towards the first gage member.

The variation of the test part from a standard dimension is indicated by measuring, by any suitable indicating means, the variation or extent of lateral movement of the second gage member 19 when the test part is in gaging position which is the position shown in Figure 1 with the gage member 11 against the stop 14. If an indicator plate 32 engages the surface 34 which is concentric with the pivot means the indicator is controlled solely or essentially so by lateral movement of the second gage member 19. In the construction particularly shown the gage member 19 carries an extension 31 which engages the plate 32 carried by an indicator 33, then the indicator is operated by a combined pivotal and lateral movement of the extension in a manner now to be described.

With the cooperating gage members in open position with their concave gaging means or surfaces 12 and 20 projecting or facing upwardly, a test part is laterally inserted therebetween or within the gaging surfaces and the test part is projected downwardly which propels the cooperating gage members downwardly until the gage member 11 is prevented from further pivotal movement by the stop means 14. The test part is then in gaging position which is at or approximately at a position determined by a line drawn between the centers of the spaced mounting means or studs 17 and 23. In this downward movement the second gage member 19 pivots with the spring 28 holding the gage member 19 to the left until a point is reached where both concave gaging surfaces fully contact or embrace the test part. This is a point above gaging position. Continued downward movement of the test part results in a combined pivotal movement for the second gage member 19 and a lateral movement on the mounting stud 23 against the tension of the spring 28. When the first gage member 11 engages the stop means 14, the second gage member 19 has been moved laterally upon its stud 23, an amount depending upon the diameter of the test part. The extent of this lateral movement of the second gaging member 19 is transmitted by the extension 31 to the indicator 33 through contact with the plate 32 thereof. The gage 34 indicates whether or not the test part is undersize or oversize and indicates the amount of variation from a standard diameter to which the gage has been previously adjusted.

The cooperating gage members 11 and 19 preferably are of substantial width, i. e. the axial dimension of the gaging means, to give an overall indication of the cumulative errors which may exist in the test part. The test part may be tapered in which case the indication is of the largest diameter of the test part. In order to provide a test for taper, "not-go" gaging means 35 may be provided to which the test part is presented after it has been removed from the gage members 11 and 19. The not-go gage means are relatively narrow or, if it is a screw thread, are provided with one or two gaging ridges or ribs to indicate the diameter of the test part at any particular diameter.

There is shown in Figures 4 and 5, a gage for providing a single pair of gage members serving to give both a go and not-go test. The gage members are essentially like those shown in Figure 1 and are consequently similarly numbered. This is a snap type of gage in that the test part passes through gaging position determined by a line between the centers of the mounting means 17 and 36 and consequently the stop means 14 is not provided.

The pivotal mounting means or stud 36 for the second gage member 19 differs somewhat from the stud 23 of Figure 1 in that it is desirable to adjust the extent of lateral movement of the gage member upon its pivot means. There are many constructions which will accomplish this, however, an eccentric stud is preferred because of its simplicity. This mounting means or stud 36 is shaped or ground eccentric preferably on diameters corresponding to the hole 39 in the gage member 19 as shown in Figure 5, so that a maximum lateral movement of the second gage member is available in excess of the tolerance allowed. The amount of eccentricity may be ten to twenty thousandths of an inch. The gaging stud is eccentric so that the position of the high points or larger dimension of the stud may be adjusted angularly depending upon the amount of permissible tolerance.

The gage member 19 may be impelled towards its cooperating gaging member 11 by any suitable means such as a spring means 37 secured to the frame 10 which engages the back surface 38 of the gage member. This surface is shown as concentric with the axis of the pivot means. This type of spring means 37 may be used with the gage of Figures 1 to 3.

Rotating the mounting stud ninety degrees from a position in which the high points or greatest diameter thereof is vertical to the line G which is or is approximately gaging position for the gage members to a point where the maximum dimension of the stud is in line with the line G or gaging position, permits adjustment of the amount of play or lateral movement of the gage member upon its stud towards and away from the cooperating gage member. The amount of permissible tolerance set into the gage is determined by the angular position of the stud between the above defined limits.

If the high points of the mounting stud are at right angles with respect to the gaging position, the gage member has its maximum degree of lateral movement which is determined by the amount of eccentricity existing in the stud. With the stud turned with the high points in line with the gaging position G there will be no or a minimum lateral movement of the gage member towards and away from its cooperating gage member. In between these two positions the amount of tolerance movement set into the gage may be adjusted at will.

In utilizing the snap type gage, the gage members may be held in open position by the handles 13 or any suitable spring means. The test part is placed within the gaging means and pressed laterally with respect thereto which swings the gage members toward gaging position and beyond if the part is not oversize. The gage members by adjustment of the eccentric stud 17 have previously been set so that a maximum allowable diameter of test part will pass therebetween and an oversized part will not. The adjusting stud 36 has been adjusted to set the permissible tolerance limits within the gage. The spring means 37 propels the laterally movable gage member 19 towards its cooperating gage member 11 to the extent of the permissible tolerance set in by the adjustment of this stud. If the test part is within the minimum allowable diameter the gage member moves laterally against the tension of the spring and this pressure can be felt by the inspector. If, however, the test part is smaller than the allowable minimum, then the gage member is given no lateral movement but has pivotal movement alone so that no pressure is exerted by the test part against the spring as it passes between the gage members and this lack of pressure on the test part can be sensed or felt by the inspector so that an undersized test part will be rejected. It will be noted, therefore, that a single pair of cooperating gage members serves both as a go and not-go gage whereby an inexpensive gage is provided.

The gage members preferably are provided with means to propel the gage members to either open or gaging position which may take any desirable form. The spring means 41 are illustrative of any means for securing this result which usually takes the form of spring means although unbalancing the weight will achieve the same result. The spring means shown propels the gage members to open position; however, by directing the force thereof in the other direction towards or through gaging position, they provide a uniform pressure gage in which the spring exerts the gaging pressure independently of the inspector and hence removes the personal element in the gaging operation.

The mounting means or studs are anchored in adjusted position such as by a nut 43. Any suitable stop means or pin 44 may limit the extent of opening pivotal movement of the gage members.

In Figure 6 the pivot means or stud 46 is circular and the bearing hole 47 is enlarged to form a slide for an adjusting shoe or bearing 48, the position of which may be adjusted by the threaded handle 13. By adjusting the position of the shoe the extent of lateral movement of the gage member 19 may be changed as desired.

This invention is presented to fill a need for improvements in a gage with pivotal and laterally movable gage member. It is understood that various modifications in structure, as well as changes in mode of operation, assembly, and manner of use, may and often do occur to those skilled in the art, especially after benefiting from the teachings of an invention. Hence, it will be understood that this disclosure is illustrative of preferred means of embodying the invention in useful form by explaining the construction, operation and advantages thereof.

What is claimed is:

1. A gage comprising a frame, a first gaging member having gaging means, means mounting the first gage member upon the frame for pivotal movement, a second gage member having gaging means to engage a circular test part at a plurality of substantially spaced points around the outer periphery thereof, pivot means spaced from the mounting means for the first gage member, said pivot means mounting the second gage member upon the frame in spaced relation to the first gage member for pivotal movement of the second gage member and its gaging means in adjacent relation to the first gage member and its gaging means, said pivot means including pin means secured to one of the elements including the gage member and the frame, and bearing means carried by the other element, the pin means being smaller in size relatively to the bearing means for free lateral movement of the second gage member upon its pivot means towards and away from the first gage member as it pivots, and means propelling the second gage member laterally towards the first gage member.

2. A gage as in claim 1 in which the second gage member has a bearing means, and the pin means for the second gage member being smaller than the bearing means thereby providing the lateral movement.

3. A gage as in claim 1 including stop means preventing the test part from passing gaging position, and indicating means operated by the second gage member as the latter pivots and moves laterally to gaging position.

4. A gage as in claim 1 including stop means preventing the test part from passing gaging position, an extension carried by the second gage member, and an indicating means engaged by the extension and operated by the pivotal and lateral movement thereof with the second gage member.

5. A gage as in claim 1 including stop means engaging one of the pivotal gage members at gaging position, and an indicator engaged by the second gage member as the latter pivots and moves laterally to gaging position.

6. A gage as in claim 1 wherein the first gage member is a pivotal member, and the mounting means therefor is a pivotal mounting means, stop means engaging the first gage member at gaging position, and an indicator engaged by the second gage member as the latter pivots and moves laterally to gaging position.

7. A gage as in claim 1 in which the second gage member has a bearing means, the mounting pin for the second gage member being smaller than the bearing means thereby providing lateral movement, stop means engaging one of the pivotal gage members at gaging position, and an indicator engaged by the second gage member as the latter pivots and moves laterally to gaging position.

8. A gage as in claim 7 in which the means for propelling the second gage member laterally towards the first gage member includes a groove in one of the parts including the second gage member and the pivot means therefor, and a bowed spring retained in the groove and engaging the other part.

9. A gage as in claim 1 in which means are provided to adjust the extent of lateral movement of the second gage member upon the pivot means.

10. A gage as in claim 1 in which the pivot means for the second gage member is eccentric and adjustable rotatably to control the tolerance limits.

11. A gage as in claim 10 in which the second gage member carries a concentric back surface, and the means for propelling the second gage member laterally is a spring engaging the concentric back surface.

12. A gage as in claim 1 in which the second gage member carries an elongated bearing means, and a shoe adjustable in the bearing means to vary the extent of lateral movement of the second gage member.

PAUL W. JOHNSON.

REFERENCES CITED

The following references are of record in the file of this patent:

UNITED STATES PATENTS

| Number | Name | Date |
|---|---|---|
| 2,432,160 | Johnson | Dec. 9, 1947 |
| 2,433,516 | Johnson | Dec. 30, 1947 |
| 2,436,528 | Polk et al. | Feb. 24, 1948 |
| 2,437,783 | Hutchinson | Mar. 16, 1948 |

FOREIGN PATENTS

| Number | Country | Date |
|---|---|---|
| 114,442 | Germany | Nov. 2, 1900 |
| 587,243 | Germany | Nov. 1, 1933 |